United States Patent
Wells et al.

(10) Patent No.: US 7,051,722 B2
(45) Date of Patent: May 30, 2006

(54) ENGINE STARTING

(75) Inventors: Dale K. Wells, Eighty Four, PA (US); Glen F. Chatfield, Bradfordwoods, PA (US)

(73) Assignee: OPTIMUM Power Technology L.P., Bridgeville, PA (US)

( * ) Notice: Subject to any disclaimer, the term of this patent is extended or adjusted under 35 U.S.C. 154(b) by 0 days.

(21) Appl. No.: 11/038,668

(22) Filed: Jan. 18, 2005

(65) Prior Publication Data

US 2005/0155581 A1    Jul. 21, 2005

Related U.S. Application Data

(60) Provisional application No. 60/537,128, filed on Jan. 17, 2004.

(51) Int. Cl.
*F02B 1/00* (2006.01)

(52) U.S. Cl. .................... 123/578; 123/478
(58) Field of Classification Search ............ 123/1 A, 123/478, 480, 575–578, 179.16
See application file for complete search history.

(56) References Cited

U.S. PATENT DOCUMENTS

| | | | | |
|---|---|---|---|---|
| 5,144,933 | A * | 9/1992 | Nakaniwa | 123/675 |
| 5,181,499 | A * | 1/1993 | Kayanuma | 123/690 |
| 5,341,786 | A * | 8/1994 | Abe et al. | 123/486 |
| 6,152,107 | A * | 11/2000 | Barnes et al. | 123/357 |
| 6,382,188 | B1* | 5/2002 | Hasegawa et al. | 123/491 |
| 6,505,594 | B1* | 1/2003 | Katayama et al. | 123/179.18 |
| 6,578,551 | B1 | 6/2003 | Yuya et al. | |
| 6,588,402 | B1 | 7/2003 | Price et al. | |
| 2001/0008134 | A1* | 7/2001 | Hasegawa et al. | 123/491 |
| 2004/0107947 | A1* | 6/2004 | Ichinose et al. | 123/491 |

FOREIGN PATENT DOCUMENTS

| | | |
|---|---|---|
| EP | 0 982 489 A | 3/2000 |
| WO | WO 03/067062 A | 8/2003 |

* cited by examiner

*Primary Examiner*—John T. Kwon
(74) *Attorney, Agent, or Firm*—Richard W. James (57) ABSTRACT

A system, an apparatus, and a method for starting an engine. The system, apparatus, and method include determining a first quantity of fuel based on engine temperature, providing the first quantity of fuel to the engine during a first cycle of the engine, determining a second quantity of fuel based on engine temperature, providing the second quantity of fuel to the engine subsequently, and transitioning to an alternative fueling strategy.

15 Claims, 4 Drawing Sheets

ENGINE STARTING

This application claims priority to Provisional No. 60/537,128, filed Jan. 17, 2004.

CROSS-REFERENCE TO RELATED APPLICATIONS

Not applicable.

STATEMENT REGARDING FEDERALLY SPONSORED RESEARCH

Not applicable.

BACKGROUND

1. Field of the Invention

The disclosed invention relates to engine starting in general and, in particular, to systems, apparatuses and methods that improve engine starting.

2. Description of the Background

An internal combustion engine is generally operated and controlled based on a current engine operational level or load, a desired engine operational level or load, often corresponding to a throttle position and sometimes corresponding to an idle air control valve (IACV) or throttle bypass circuit, amounts of fuel and air injected into cylinders of the engine, ignition timing where applicable, and consideration of other parameters as desired. Engines are generally operated differently when they are being started than after they have been started.

Engines are furthermore generally started in one of two ways: automatically or manually. An automatic start may employ a power source such as a battery. The battery may be used to power an electric motor to turn the engine while fuel and air is provided to the cylinders until the engine begins cycling from the combustion occurring in the cylinders. When a manual start is utilized, the engine may be rotated manually by, for example, a kick-start on a motorcycle.

Typically, more fuel and air is supplied to cylinders of an engine when the engine is starting than when the engine is idling under normal operating conditions. That additional fuel and air may be needed to wet fuel supply surfaces, to compensate for poor fuel vaporization, and to produce a combustible charge in the cylinder, for example. Supplying excess fuel, however, generally reduces engine efficiency and increases the discharge of undesirable emissions from the engine.

In addition, improper amounts of fuel and air or improper timing of the provision of fuel and air to the engine may impede engine starting.

Thus there is a need for a system, an apparatus, and a method that provides an appropriate amount of fuel and air to an engine and provides that fuel and air at an appropriate time to optimize engine starting.

There is also a need for a system, an apparatus, and a method that provides an appropriate amount of fuel and air to an engine when starting and provides that fuel and air at an appropriate time to maximize efficiency and minimize the discharge of undesirable emissions from the engine.

In addition, there is a need for a system, an apparatus, and a method that transitions from an optimum engine starting condition to an optimum engine operating condition while promoting favorable engine operation and a system, an apparatus, and a method that transitions from an optimum starting condition to an optimum operating condition while promoting engine efficiency and low emissions of undesirable compounds.

SUMMARY

Accordingly, the engine starting systems, apparatuses, methods described herein provide solutions to the shortcomings of prior engine starting systems, apparatuses, methods. Those of ordinary skill in the art will readily appreciate that other details, features, and advantages of engine starting will become further apparent in the following detailed description of the preferred embodiments.

In an embodiment, engine starting provides systems, apparatuses and methods that determine a first quantity of fuel based on engine temperature, provide the first quantity of fuel to the engine during a first cycle of the engine, determine a second quantity of fuel based on engine temperature, provide the second quantity of fuel to the engine subsequently, and transition to an alternative fueling strategy.

In another embodiment, engine starting provides systems, apparatuses and methods that retrieve a first quantity of fuel from a starting fuel table based on engine temperature, provide the first quantity of fuel to the engine during a first cycle of the engine, retrieve a second quantity of fuel from the starting fuel table based on engine temperature, provide the second quantity of fuel to the engine subsequently, and transition to an alternative fueling strategy.

In yet another embodiment, engine starting provides systems, apparatuses and methods that retrieve a first quantity of fuel from a starting fuel table based on engine temperature, provide the first quantity of fuel to the engine during a first cycle of the engine, determine a second quantity of fuel from the first quantity of fuel, provide the second quantity of fuel to the engine subsequently, and transition to an alternative fueling strategy.

An engine fueling device includes a processor that is coupled to a signal that corresponds to engine temperature and is coupled to a fuel supply control device. The processor of that device determines a first quantity of fuel based on engine temperature, provides the first quantity of fuel to the engine through the fuel supply control device during a first cycle of the engine, determines a second quantity of fuel based on engine temperature, provides the second quantity of fuel to the engine through the fuel supply control device subsequent to providing the first quantity of fuel, and transitions to an alternative fueling strategy.

Computer readable media that can operate as those apparatuses or within those systems or cause a processor to perform those methods are also provided.

BRIEF DESCRIPTION OF THE DRAWINGS

The accompanying drawings, wherein like reference numerals are employed to designate like parts or steps, are included to provide a further understanding of engine starting, are incorporated in and constitute a part of this specification, and illustrate embodiments of engine starting that together with the description serve to explain the principles of the engine starting.

In the drawings.

DETAILED DESCRIPTION

Reference will now be made to embodiments of systems, apparatuses, and methods to start an engine.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification are not necessarily all referring to the same embodiment. References to "or" are furthermore intended as inclusive so "or" may indicate one or another of the ored terms or more than one ored term.

It is to be understood that the figures and descriptions included herein illustrate and describe elements that are of particular relevance to engine starting, while eliminating, for purposes of clarity, for example, certain elements found in typical engine management systems and engines because the construction and implementation of such other elements are well known to those skilled in engine starting and operation, and because a discussion of them would not facilitate a better understanding of engine starting. It is also to be understood that the embodiments of engine starting that are described herein are illustrative only and are not exhaustive of the manners of embodying engine starting. For example, it will be recognized by those skilled in engine starting and operation that engine starting may be readily adapted to starting of engines other than the gasoline or other hydrocarbon powered automobile and motorcycle engines discussed herein, such as, for example, diesel engines, truck engines, and small engines such as those used on lawn mowers and other appliances.

Designers of engines, engine components and components related to engines may strive to make each combustion event in each cylinder repeatable. Each combustion event, however, tends to be unique even when an engine is operating at a steady-state. That may be, at least in part, because each combustion event involves many factors, with each occurring in a short period of time, and even small variations in those factors may cause combustion events to vary. All of those factors will not be considered herein, but a few factors will be considered as examples.

For example, a quantity of fuel that is provided to a cylinder may vary dependent upon many factors including the pressure of the fuel being injected, the quantity of fuel being supplied, deposition of fuel on or collection of fuel from collateral sources such as walls of an inlet tract extending from a fuel injector to the cylinder and surfaces of the inlet valve and the airstream in the inlet tract, and the voltage applied to an injector when the fuel injector is operated in a fuel injected engine.

It should be noted that, while the engine starting systems, apparatuses, and methods described herein may be applied to at least carbureted and fuel injected engines, examples hereafter will generally be discussed in the context of a fuel injected engine.

Regarding collateral fuel sources, once an engine is operating, fuel that is added from collateral sources and removed by collateral sources will typically vary, particularly when fueling is increasing or decreasing, but after operation has begun, fuel is usually both added and removed by those collateral sources to some extent. When an engine is initially cold started, however, no fuel may reside in or on the collateral sources and so fuel may only be collected or removed from the fuel stream directed to the cylinder or cylinders by those collateral sources. Moreover, the amount of fuel removed by those collateral sources may be a significant quantity that is required to wet the various surfaces of the fuel inlet, for example. As may be recognized, engine starting provides a unique circumstance with regard to fueling and collateral sources of fuel.

The quality of the fuel introduced into a cylinder during a combustion event may also vary, for example, due to compounds such as light hydrocarbons that may be present in the fuel in varying quantities.

Other factors that may vary during combustion events include the quantity and quality of air provided during the combustion event and the quality of spark provided in engines utilizing spark to ignite the fuel. Airflow to the cylinders may vary depending on a variety of factors including the pressure of the air and the composition of the air, which is a mixture of oxygen used in combustion and many other compounds, often including impurities that may be introduce into the airstream.

In addition, liquid fuel such as gasoline burns in a vaporized state. Moreover, heat is typically a major factor in vaporizing fuel. Such heat may be applied in various ways including from contact with warm air, from contact with metal in close proximity to a warm engine, from contact with warm valves, pistons or cylinder walls, or from compression in the cylinder. Therefore, heat, and the fuel vaporization that is in part caused by heat, may vary greatly from combustion event to combustion event. As will be recognized, when an engine is initially cold started, the engine and cylinders may not be heated and vaporization may be reduced providing another unique engine starting circumstance.

At engine start-up, engine friction is typically higher than under normal operating conditions following start-up. Therefore, the quantity of fuel required at start-up may be greater than the quantity of fuel needed during normal operation to overcome greater fricitional forces. Higher frictional forces typically exist in the engine at startup because the lubricating oil is more viscous.

For at least those reasons, fueling calibrated for normal steady-state engine operation may not be appropriate for the conditions that exist at engine start-up. Accordingly, the present engine starting apparatuses and methods may improve engine starting over previous systems.

Figure 1:
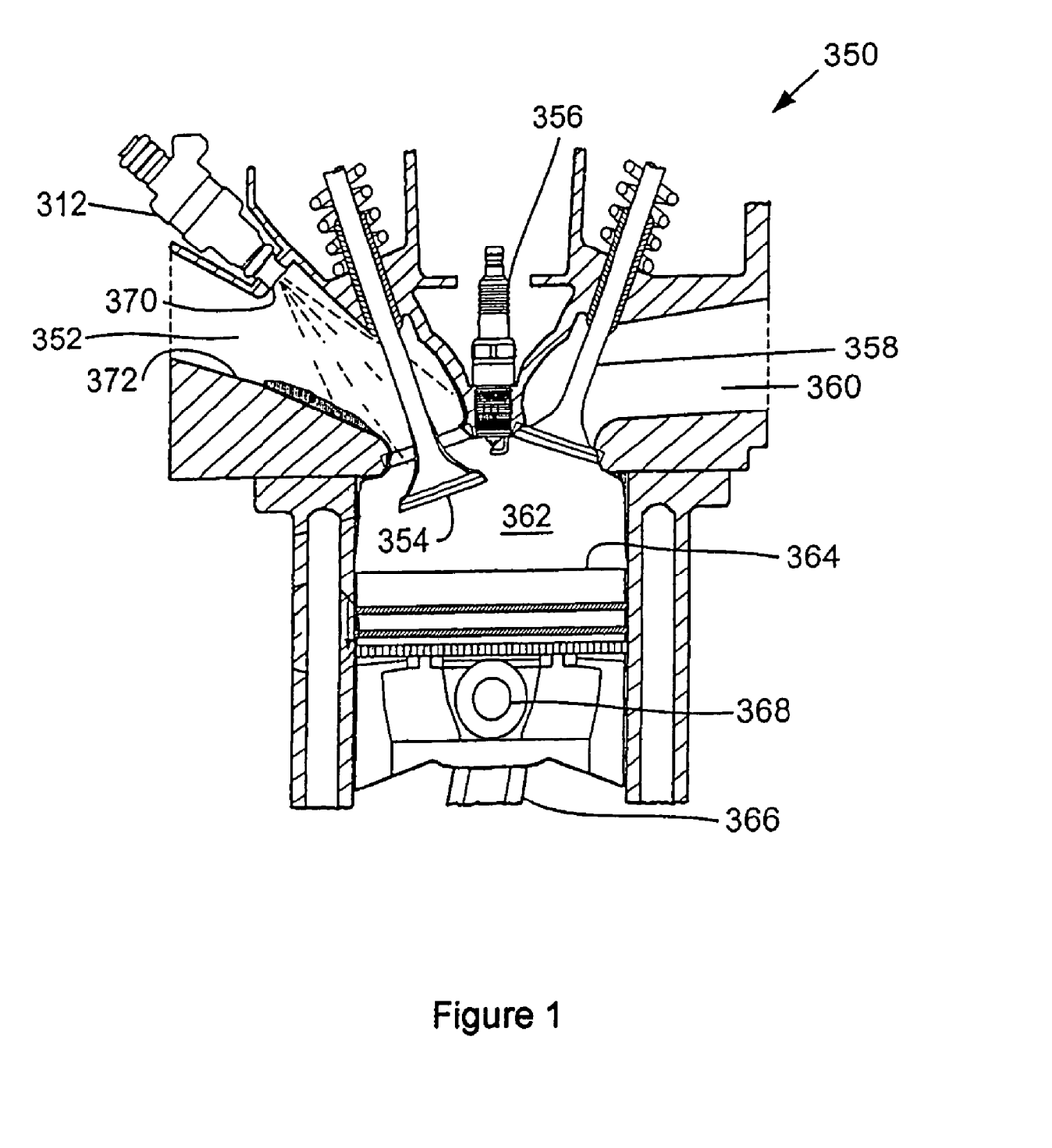
FIG. 1 illustrates a cross-sectional view of an embodiment of a cylinder in a 4-stroke engine.

FIG. 1 illustrates an embodiment of a cylinder of a four-stroke gasoline powered engine 350 that may be utilized in connection with the present invention. It will be recognized that other cylinder configurations may be utilized with the present invention including, for example, two-stroke engines, carbureted engines, diesel engines, and configurations in which a fuel injector 312 supplies fuel to either one or multiple cylinders 362. The embodiment of FIG. 1 includes the fuel injector 312, an inlet tract 352, an inlet valve 354, a spark plug 356, an exhaust valve 358, an exhaust tract 360, the cylinder 362, and a piston 364 attached to a crankshaft (not shown) via a connecting-rod 366 and a bearing 368.

Pressurized fuel from a fuel line (not shown) coupled to the fuel injector 312 may be sprayed through a nozzle 370 of the fuel injector 312 when a valve (not shown) is opened permitting fuel to flow through the fuel injector 312. That valve may be an electrically operated solenoid valve that is actuated through an output of an engine control unit. Control of such a solenoid valve is usually performed by pulse width modulation such that a longer opening duration will provide more fuel into the cylinder or cylinders 362 supplied by the fuel injector 312.

A butterfly valve (not shown) may be positioned to permit airflow into the inlet tract 352 of one or more cylinders 362. The butterfly valve may be pivotal about an axis between a first position preventing airflow into the inlet tract 352 and a second position permitting airflow into the inlet tract 352. An actuator cam (not shown) may be connected to the butterfly valve for pivoting the butterfly valve against the bias of a return spring, e.g., a torsion spring, from the first position to the second position. The actuator cam can be connected, via a throttle cable (not shown), to an operator controlled throttle control element (not shown). Alternately, the actuator cam may be controlled by an output of the engine control unit and the operator controlled throttle control element may serve only as an input to the engine control unit.

A throttle position sensor may, for example, be connected to the butterfly valve for measuring the angular position of the butterfly valve as it is pivoted about the axis, and/or may be connected to a throttle control element for input to the engine control unit. Fuel quantity may furthermore be provided to one or more cylinders in accordance with a desired ratio of fuel to air, such as a stoichiometric mixture of 14.7 parts air to each part gasoline.

In a cylinder of a 4-stroke engine 350, such as that illustrated in FIG. 1, fuel is typically permitted to flow through the inlet valve 354 to the cylinder 362 or multiple cylinders. The inlet valve 354 then closes and the fuel is ignited by the spark plug 356, thereby driving the piston 364 away from the inlet valve 354 and outlet valve 358. The exhaust valve 358 opens as the piston 364 moves back toward the inlet valve 354 and the exhaust valve 358, thereby forcing exhaust gases out of the cylinder 362, through the exhaust valve 358 and away through the exhaust tract 360.

It should be noted that fuel delivered to the cylinder 362 often passes through an inlet tract 352 where the fuel may be mixed with an oxidant, such as air, drawn through the inlet tract 352. Liquid fuel may thus build-up on a wall 372 of the inlet tract 352 or on the back of the inlet valve 354 opposite the cylinder. Fuel may be delivered both during the approximately one-quarter cycle of a cylinder 362 in a four-stroke engine 350 when the inlet valve 354 is in an open position and during much of the three-quarters of a cycle when the inlet valve 354 is in a closed position when, for example, the engine is under high load. Thus, substantial fuel build-up may occur on the inlet tract walls 372, on the intake valve 352, and in the airstream present in the inlet tract 352, particularly under such high load engine conditions.

Engines have common characteristics that may not be universal. One common engine configuration includes several cylinders and is started by an electric motor that turns the engine while fuel and air and possibly spark are supplied to the cylinders. Such an electric motor often turns the engine slowly but continuously. As certain of the several cylinders fire, they may assist the electric motor in turning the engine until the engine is operating without need of the electric motor, at which time the electric motor may cease to operate.

Another common engine configuration includes one or a few cylinders and is started manually. For example lawn mowers, chain saws, and other devices may be started using a pull-start mechanism. Moreover, a motorcycle engine may have one or two cylinders and be started by a kick-start device. Generally, a kick start turns the engine more quickly than an electric motor if the kick-start is operated with vigor, but a kick-start turns the engine a limited distance or number of cycles, after which, if the engine has not started, another kick-start operation would be performed in another attempt to start the engine. Of course other starting devices and methods may be found and various starting devices and methods may be matched to engines of various configurations and sizes having any number of cylinders. Those two common configurations will, however, be used throughout the following description to illustrate engine starting.

Engine starting may be particularly difficult in engines having only one or a few cylinders. In engines having more cylinders, as each cylinder fires, or is started, it assists in turning the engine, thereby helping to start additional cylinders and the additional cylinders help to start still more cylinders until all cylinders fire. In a one cylinder engine, for example, it may be important to start the cylinder firing in its first or second cycle (each of which may be 360 degrees in a 2-stroke engine or 720 degrees in a 4-stroke engine) as there are no other cylinders to rotate the engine and assist that one cylinder in firing. It may also be important to start that single cylinder in its first or second cycle where a kick-start is used and the kick-start only turns the engine one or two cycles.

In many engine applications, an amount of fuel directed into the engine is determined by a fueling map or table. Table 1 illustrates a map that is a simplified version of a typical map, but that illustrates map usage. Each setpoint in the map illustrated in Table 1 corresponds to the values of two engine operating characteristics, i.e., an engine speed value and an engine load value. Thus, for a given engine speed (e.g., as sensed by or derived from an output signal from a crankshaft angular motion sensor coupled to an engine) and for a given value of engine load (e.g., as measured by the throttle position sensor), fuel quantity setpoints are assigned and may be read from the map. Engine load may also be determined by another sensor, such as a manifold pressure sensor or a mass air flow sensor, or engine load may computed from one or more sensor readings.

For example, the map illustrated in Table 1 causes the engine control unit to deliver twenty-five milligrams of fuel per cycle at 2000 revolutions per minute (rpm), when the throttle is opened 50%. At 5000 rpm, when the throttle is fully open, the engine control unit will vary fuel delivery to provide fifty milligrams of fuel per cycle. Thus, when either the engine load (e.g., throttle position) or engine speed changes, the fuel delivery system will determine an initial, steady-state amount of fuel that is to be delivered at the new speed and load by reference to the map.

TABLE 1

| Fuel Delivery (milligrams per cycle) | | Engine speed (revolutions per minute) | | | |
| --- | --- | --- | --- | --- | --- |
| | | 1000 | 2000 | 5000 | 7000 |
| Load (Percentage Throttle Opening) | 5 | 7 | 5 | 4 | 3 |
| | 25 | 10 | 21 | 15 | 10 |
| | 50 | 15 | 25 | 37 | 30 |
| | 75 | 15 | 25 | 44 | 40 |
| | 100 | 15 | 25 | 50 | 45 |

In general, a map will include a greater number of setpoints than shown in the map illustrated in Table 1 so that the setpoints may be assigned for smaller increments of measured value for each engine operating characteristic utilized in the map. In an embodiment, a map includes 17 divisions in each of engine speed and engine load. It should also be noted that the divisions may be in equal increments or may be divided in unequal increments, whichever is most beneficial to engine operation.

If the operating state of the engine falls in a gap between specified values of the characteristics (e.g., in Table 1, there are gaps of 1000 rpm or more between the specified values for engine speed and 20% or more gaps in engine load), the engine control unit may interpolate the operating control values between the two closest speed columns and the two closest load rows or the equivalent thereto.

Maps utilized during normal engine operation are typically optimized for steady-state engine operation and so will be referred to herein as steady-state fuel maps. Those maps are furthermore typically not optimized for engine starting and, if referenced, may not provide a proper fuel amount to start an engine. Thus, fuel provided when an engine is started may be determined separately from the steady-state fuel map or may involve a variation on an amount of fuel that would be provided based on the steady-state fuel map (e.g., a percentage of the fuel that would be provided during normal operation may be provided when the engine is started).

In an embodiment in which starting fuel to be provided to an engine at engine start is based on steady-state fuel map fueling and the steady-state fuel map includes seventeen divisions for engine speed and seventeen divisions for load, the second through fifth load divisions may be considered during engine starting. It should be recognized that other divisions may be referenced as may be appropriate for a particular application. Engine speed is not considered in this embodiment as it is generally known that the engine is not rotating and is thus operating at zero rpm immediately prior to engine start-up. Therefore, only the first column of steady-state fuel map data is used. One or more sensed temperatures may also be utilized in determining the quantity of starting fuel to be provided. For example, engine coolant temperature, exhaust temperature, or another temperature indicative of engine temperature may be utilized in a function to be applied to the steady-state fuel quantity retrieved from the steady-state fuel map. Such an engine temperature indicator may be utilized to increase the quantity of fuel provided at start-up when the engine is cool versus when the engine is warm. Alternately or in addition, ambient air temperature may be considered since the density of air depends, at least in part, on the temperature of air. Thus, start-up fuel quantities may be increased when the ambient air temperature is warm, indicating that the air may be less dense. Such a strategy based on the steady-state fuel map fueling may be beneficial because it may be portable such that with little or no modification the strategy may be applied to a variety of engines.

Throttle position may be considered to indicate desired load and to match fuel provided to the engine to air flow being provided to the engine. Moreover, the second through fifth load divisions of a seventeen division map may be considered during engine starting because that range has been found to include fuel quantities appropriate for engine starting.

Thus in an embodiment, in which an engine temperature based function of the steady-state fuel quantity is utilized to calculate a start-up fuel quantity for an engine, a steady-state quantity of fuel may be retrieved from a steady-state fuel map. That steady-state fuel quantity may be adjusted, based on the current engine temperature, to determine a first quantity of fuel to be delivered to the engine. Other functions, based on other sensed or stored data, may also be applied to this adjusted steady-state fuel quantity to arrive at the first quantity of fuel to be delivered to the engine.

For the second quantity of fuel to be delivered to the engine, the same or another multiplier or function may be applied to the fuel quantity retrieved from the steady-state fuel map for the first quantity of fuel to be delivered to the engine. Alternatively, a new fuel quantity may be retrieved from the steady-state fuel map and a multiplier or another factor may be applied to that new fuel quantity to arrive at the second fuel quantity to be delivered to the engine. Often, that second quantity of fuel would be less than the first quantity of fuel.

Thus, in one embodiment, the fuel quantity retrieved from the steady-state fuel map for the first quantity of fuel is multiplied by a factor of 0.75 to determine a second quantity of fuel to be delivered to the engine following delivery of the first quantity of fuel.

Additional fuel quantities may furthermore be determined by applying a multiplier or other function to the steady-state fuel quantities retrieved from the steady-state fuel map until the engine has started and is ready to be transitioned to operation in accordance with the steady-state fuel map without use of a starting factor or other function.

A primer quantity of fuel may also be provided prior to starting the engine. For example, a primer quantity of fuel may be predetermined or selected based on the steady-state fuel map. That primer quantity of fuel may furthermore be altered based on various parameters including the position of the throttle, ambient air temperature, engine temperature, or another engine or engine control parameters affecting engine starting.

An idle air control valve (IACV) or throttle bypass circuit may be used in place of or in addition to throttle position. The IACV position is typically determined by the engine controller or engine control unit using, for example, current engine temperature and air temperature. In an embodiment, the sum of throttle position and the equivalent throttle opening for the IACV position may be used to determine the engine load for map lookup as used in this embodiment. The steady-state fueling associated with the sum of the throttle position and the equivalent throttle opening for the IACV may then be read from the steady-state fuel map and the steady-state quantity of fuel may be multiplied by an appropriate factor or modified by a function as described above to arrive at an appropriate starting quantity of fuel. In this way, the fueling amount for starting is dependent on engine temperature.

In other embodiments, one or more priming fuel tables are utilized for fueling during engine starting. Those priming fuel tables may be prepared for engine starting and may not be appropriate for steady-state engine operation.

In one such embodiment, first and second priming fuel columns are provided in a priming fuel table. Each of the first and second columns may furthermore be divided into a range of possible engine load ranges that may be expressed in terms of throttle position. Engine speed may not be considered in this embodiment as it is generally known that the engine is not rotating immediately prior to engine start-up. Throttle position may furthermore indicate a combination of throttle position and an equivalent throttle position associated with an opening of an IACV.

Each of the first and second priming fuel columns is divided into four parts in this embodiment. Each row corresponds to a throttle position that may or may not be the as same values found in the steady state fueling tables. Values may furthermore be interpolated in the same manner as is done for the steady state fueling tables.

It should be noted that an IACV position may be used to specify load for the purpose of determining fuel flow during start-up instead of throttle position or a combination of throttle position and IACV if desired. For example, the IACV may have a range of 0–100% and that range may be associated with the divisions of the priming fuel table. Alternately, where IACV position is to be used to indicate load during start-up, IACV position may be associated with corresponding throttle position such that, for example, the IACV may have a full range that is equivalent to a throttle range of 0–15%. If it is desired to consider both throttle position and IACV position, it may be beneficial to associate IACV position to throttle position and, for example, utilize the sum of throttle position and IACV position in determining which value from the priming fuel table is to be used for engine start-up or in determining which division of the steady-state fuel map is to be used where a function of the steady-state fuel map is used for engine start-up. In that way, the engine controller may set the IACV to a desired position and air and fuel delivered to the engine during start-up can be matched to the engine requirements.

It may be desirable and possible to transition from starting fueling to steady-state map fueling quickly utilizing the starting strategy disclosed herein. For example, it may be possible to transition to steady-state map fueling after only one, two, or a few engine cycles, at least in part because the cylinder typically warms quickly, which aids in vaporizing fuel. It may be desirable to transition after only one, two, or a few engine cycles, for example, to minimize fuel provided to the engine to promote efficient use of fuel, to minimize the discharge of undesirable emissions, and to assist in creating a quick start, particularly where kick-starting is utilized.

It should be noted that the map from which engine fueling quantities are retrieved and to which engine fueling control transitions may be other than a steady-state map. Any map, including a map arranged specifically for fueling at engine start-up or another map utilized for fuel control, may be used for such purpose and a steady-state map is offered as an exemplary map herein because such steady-state maps are often used in engine control.

Although the amount of fuel to be directed into the engine may vary dependent on, for example, engine size and configuration, in an embodiment, 60 mg of fuel is scheduled to be delivered to the engine by the first priming fuel column when the throttle is in a 7% position, 70 mg of fuel is scheduled to be delivered to the engine by the first priming fuel column when the throttle is in a 9% position, 80 mg of fuel is scheduled to be delivered to the engine by the first priming fuel column when the throttle is in an 11% position, and 90 mg of fuel is scheduled to be delivered to the engine by the first priming fuel column when the throttle is in a 15% position. Moreover, in that embodiment, 40 mg of fuel is scheduled to be delivered to the engine by the second priming fuel column when the throttle is in the 7% position, 50 mg of fuel is scheduled to be delivered to the engine by the second priming fuel column when the throttle is in the 9% position, 60 mg of fuel is scheduled to be delivered to the engine by the second priming fuel column when the throttle is in the 11% position, and 70 mg of fuel is scheduled to be delivered to the engine by the second priming fuel column when the throttle is in the 15% position. Table 2 illustrates that priming fuel table configuration. It should be recognized that the columns could be otherwise arranged as rows, or separate tables, or in any other configuration desired. Engine load values other than the breakpoint values may furthermore be interpolated.

TABLE 2

| Fuel Delivery (milligrams per cycle) | | Start-Up Fuel Column | |
|---|---|---|---|
| | | 1 | 2 |
| Load (Percentage Throttle Opening) | 7 | 60 | 40 |
| | 9 | 70 | 50 |
| | 11 | 80 | 60 |
| | 15 | 90 | 70 |

Figure 2:
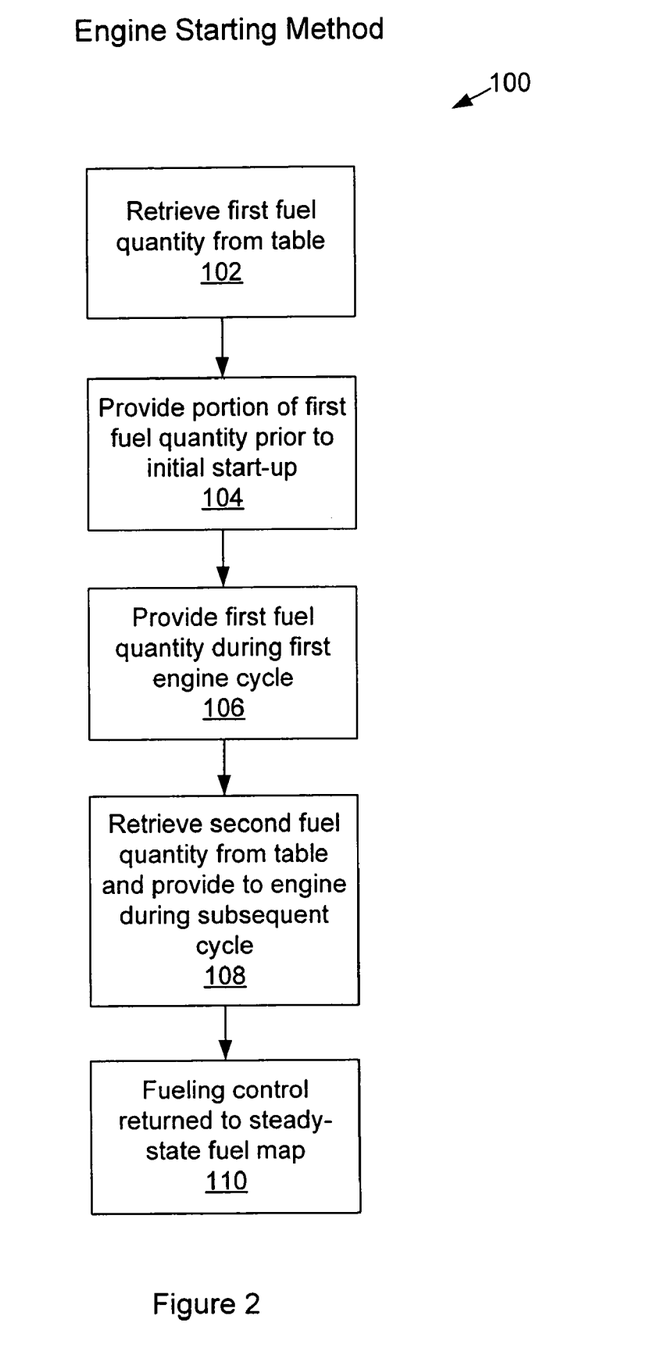
FIG. 2 illustrates an embodiment of a method of starting an engine.

FIG. 2 illustrates a method of using a start-up fuel table to start an engine 100, utilizing the sample start-up tables of Table 2 to illustrate that usage. At 102, a quantity of fuel to be provided to the engine during the first cycle of the engine is retrieved from the start-up fuel table. That value may be found in Table 2 in the first column of the start-up fuel table and may be based on the current throttle position. That quantity of fuel may be indicated as a mass of fuel in units of milligrams, for example. At 104, a primer portion of the quantity of fuel retrieved from the first column of the start-up fuel table is provided to the engine prior to a first engine cycle. That primer portion may, for example, be 150% of the quantity of fuel retrieved from the first column of the start-up fuel table and 104 may be performed only when the engine is being cold started initially. It should be noted that a primer portion may alternately be calculated from a steady-state fuel quantity and provided to the engine prior to a first engine cycle in this embodiment or in the embodiment where start-up fuel is based on a steady-state fuel map.

An initial engine cold start is one that follows a significant period of time during which the engine has not operated or been attempted to be started and during which any significant amount of fuel previously provided to the engine should have evaporated. For typical engines, that time might range from 15 minutes to several hours. At initial cold start, a variation on start-up fueling may be performed to provide an initial primer amount of fuel to the engine. Thus, at initial engine start, primer fuel may be provided at 104. That primer fuel may furthermore be provided prior to cycling the engine. Initial engine cold start may be recognized in many ways including, for example, operator actuation of the throttle past a predetermined point such as 90% of the maximum throttle position in keeping with priming of mechanical fuel delivery systems. The engine controller may also perform priming automatically, based for example on elapsed time since the engine has been running, or by reading the engine temperature vs. air temperature.

At 106, a function based, for example, on engine temperature and possibly air temperature may be applied to the quantity of fuel retrieved from the first column of the start-up fuel table and the resultant quantity of fuel may be provided to the engine. That quantity of fuel may be provided during an engine cycle following provision of the primer fuel at 104 if the start is an initial cold start. Since primer fuel may be provided prior to cycling the engine, the first quantity of fuel retrieved from the start-up table and adjusted for engine temperature may be provided to the engine during the first cycle of the engine. If the start is not an initial engine start, then priming fuel may not be provided to the engine, but the adjusted quantity of fuel retrieved from the first column of the start-up fuel table may nonetheless be provided to the engine at 106 during a first cycle of the engine.

A start that is not an initial cold start may include any engine start that quickly follows a previous failed start that may have provided fuel that remains in the engine or the inlet tract. A start that is not an initial cold start may also include any start that follows normal engine operation and shut-off of the engine because the normal operation may have raised the engine temperature or provided fuel that remains in the engine, thereby permitting engine restarting without providing primer fuel, for example at 104. In these conditions, it may be desirable to provide no priming fuel or to provide a reduced amount of priming fuel to avoid flooding the engine or to reduce the engine's emissions. Thus, a reduced priming fuel amount may, for example, be computed by a decay factor, or may be computed from a factor retrieved from a table. The reduced priming amount may furthermore be limited to a minimum of the steady-state fuel table values.

At 108, a quantity of fuel to be provided to the engine is retrieved from the second column of the priming fuel table based again on the current throttle position, IACV position, another basis, or a combination thereof. The quantity of fuel retrieved from the second column of the priming fuel table may then have a function applied to it based, for example, on engine temperature and possibly air temperature, and is provided to the engine. That quantity of fuel may be provided during a subsequent engine cycle following the engine cycle in which the quantity of fuel retrieved from the first column of the priming fuel table was provided to the engine at 106, or it may be provided during the second engine revolution.

At 110, fueling control may be returned to the steady-state fuel map if the engine started. Such a quick transition to the steady-state fuel map may beneficially minimize the number of engine cycles during which a rich fuel mixture is provided to the engine, thereby typically improving engine fuel efficiency and minimizing discharge of undesirable pollutants from the engine that are common when burning a rich fuel mixture, such as at start-up.

It should be recognized that any desired number of priming fuel tables may be utilized and that those priming fuel tables may have any number of parts divided into any gradation desired. It should also be recognized that the divisions of the priming fuel tables may be based on other than throttle position and IACV position. For example, the priming fuel table divisions may be based on engine temperature.

The timing of fuel delivery to the engine may be controlled to optimize engine starting. Fuel may be desired to be delivered to a cylinder of an engine when a piston within the cylinder is near its top dead center (tdc) position, or when the intake valve is about to close. In one embodiment, fuel is desired to be delivered to each cylinder of an engine at five degrees before those cylinders reach top dead center.

Engine position prior to starting may be known from previous engine cycling and movement of the engine pistons may be measured in various known ways, such that fuel may be delivered to each cylinder when the associated piston reaches the desired position. Alternately, engine position prior to starting may be unknown, but may be sensed as the engine begins to rotate at start-up. For example, an engine position sensor such as a flywheel, crankshaft position sensor, cam shaft position sensor, rotor for an alternator, or other disk that rotates during engine operation may have markings or variations in shape, such as one or more teeth, that may be used to determine engine position by sensing the passing of those marks or shapes by a sensor as the disk rotates past the engine position sensor.

In an embodiment wherein a 4-stroke engine is being started, during an initial start, an initial primer quantity of fuel, such as that described at 104, may be provided to cylinders of the engine prior to beginning engine rotation. A quantity of fuel retrieved from the first column of the priming fuel table may then be provided to cylinders of the engine during the first 360 degrees of rotation near either top dead center or bottom dead center. A quantity of fuel retrieved from the second column of the priming fuel table may thereafter be provided to cylinders of the engine during the second 360 degrees of rotation near either top dead center or bottom dead center. Fueling control may then be returned to the steady-state fuel map and fuel may be delivered near top dead center each 720 degrees of rotation.

In another embodiment in which a 2-stroke engine is being started, the starting sequence may be as described in connection with a 4-stroke engine, with regular engine operation providing fuel every 360 degrees of rotation rather than every 720 degrees of rotation.

In an embodiment of engine starting, the quantity of fuel provided to the engine is varied dependent on temperatures. Those temperatures may be one or several temperatures related to the engine or ambient air conditions. For example, the quantity of fuel may be varied based on engine coolant temperature. Moreover, the quantity of fuel to be delivered may, for example, be as retrieved from the appropriate column of the primer fuel table when the engine coolant is 60 degrees Fahrenheit or warmer and may be increased by a factor such as 0.02 per degree below 60 degrees Fahrenheit. Alternately, a quantity of fuel to be added to the quantity read from the appropriate primer fuel table may be retrieved from a temperature table.

In another embodiment of engine starting, an article of manufacture includes a computer readable medium having stored thereon instructions which, when executed by a processor, cause the processor to perform the method described in connection with FIG. 2 and variations described elsewhere herein.

Figure 3:
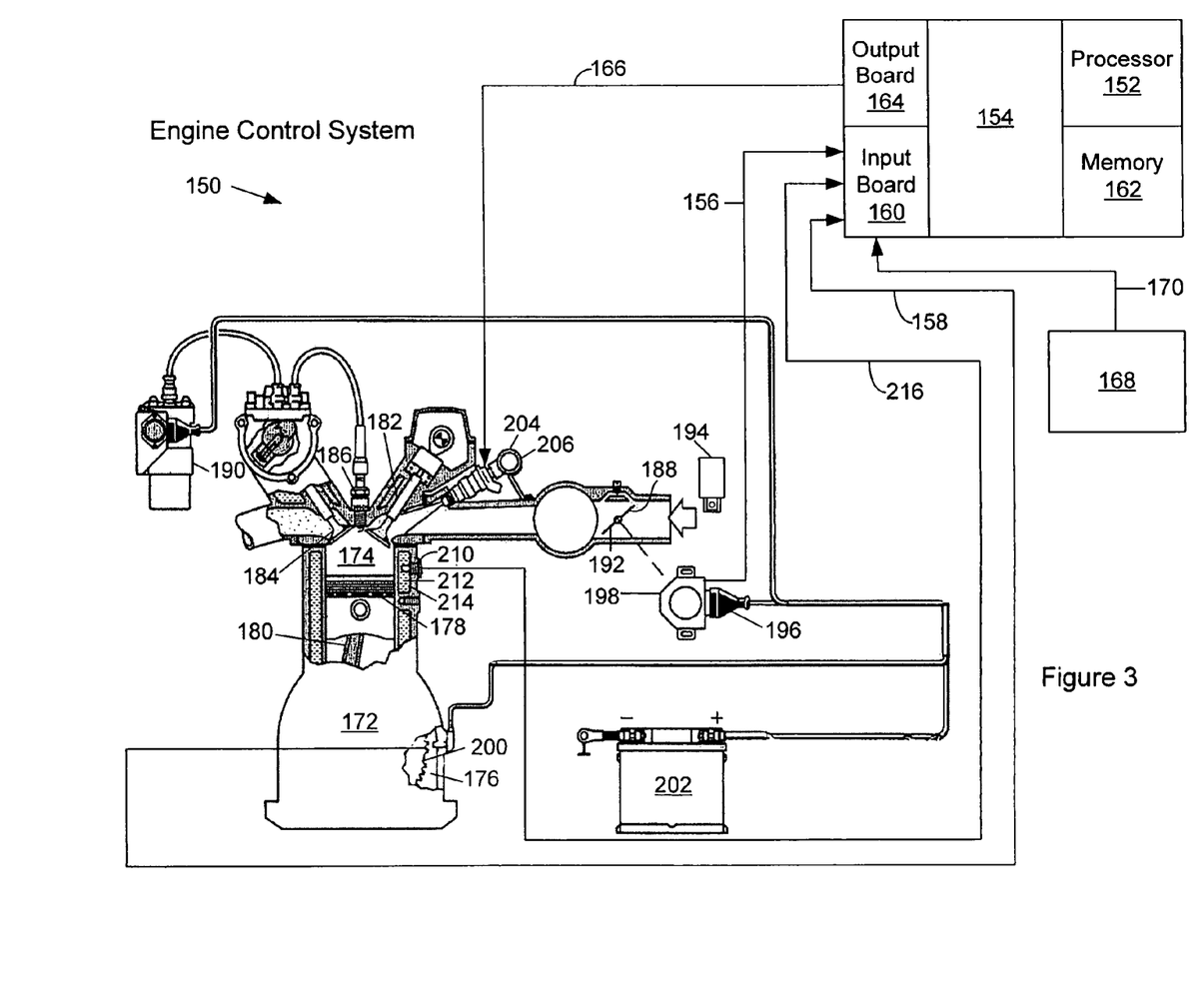
FIG. 3 illustrates an embodiment of an engine control system with which an engine may be started.

FIG. 3 illustrates an embodiment of an engine control system 150 that may be utilized to start an engine. The engine control system 150 includes an internal combustion engine 172 having a cylinder 174, and a crankshaft 176. The cylinder 174 contains a piston 178 having a connecting rod 180 that connects to the crankshaft 176. An intake valve 182, an exhaust valve 184 and a spark plug 186 extend into the cylinder 174.

An air intake control device 188 and a fuel supply control device 204 provide air and fuel to the intake valve 182 and the cylinder 174. The air intake control device 188 may include, for example, a butterfly valve 192 or gate valve to control the quantity of combustion air delivered to the engine 172. An air mass sensor 194, which may be, for example, a temperature or pressure sensor may be used to measure air flow into the engine, and may be located in the air intake. An air temperature sensor 168 may be used to measure the intake air temperature and transmit a signal 170 to the engine control unit 154.

The fuel supply control device 204 may be, for example, a fuel injector 206 or a carburetor. The fuel injector 206 or carburetor may include an actuator coupled thereto to control fuel flow through the fuel injector 206 or carburetor. A signal, such as a pulse-width modulated signal, may be transmitted from the engine control unit 154 to the actuator to provide fuel flow through the fuel injector 206 or carburetor.

A throttle position sensor 196 may be attached to sense the position of an operator actuated throttle switch 198 as an indicator of desired engine load. An engine encoder 200 may sense rotation of the crankshaft 176 as an indicator of actual engine speed. A battery 202 may provide power to portions of the engine control system 150 requiring electrical power.

A coolant temperature sensor 210 may be mounted to sense the temperature of engine coolant 212 that flows through a coolant chamber 214 in the engine 150.

The components of the engine control system 150 may operate in a known fashion, while control of, for example, the amount of fuel to be provided by the fuel supply device 204 may be varied by the engine control unit 154 utilizing the methods described in connection with the start-up fuel table and start-up fueling using a steady-state fuel map to start an engine 100 as illustrated in FIG. 2. For example, in the engine control system 150 of FIG. 3 an embodiment of engine starting may be performed by the processor 152 in the engine control unit 154. In that embodiment, one or more input signals 156, 158, 170, and 216 are received at an input board 160 in the engine control unit 154.

The processor 152 may be coupled to memory 162 and may execute program instructions and process information stored in the memory 162. Information may comprise any data capable of being represented as a signal, such as an electrical signal, optical signal, acoustical signal and so forth. Examples of information in this context may include quantities to be provided to the engine 172 such as a steady-state fuel map and a start-up fuel table.

In one embodiment, the instructions are stored in memory 162 in a machine readable format. As used herein the phrase, "executed by a processor" is intended to encompass instructions stored in a machine readable format, as well as instructions that may be compiled or installed by an installer before being executed by the processor 152.

The memory 162 may, for example, include cache, random access memory (RAM) such as dynamic RAM or static RAM, read only memory (ROM) such as programmable ROM, erasable programmable ROM, or electronically erasable programmable ROM, or mass storage devices such as a magnetic disk or optical disk. The memory 162 may store computer program instructions and information. The memory 162 may furthermore be partitioned into sections including an operating system partition, wherein instructions including those for performing engine starting may be stored, and a data partition in which information such as a value retrieved from the steady-state map or the start-up table may be stored.

The signals 156, 158, 170, and 216 in that embodiment are received from a throttle position sensor 196, an engine rotational speed sensor 200, an air temperature sensor 168, and a coolant temperature sensor 210 respectively in the engine control system 150 illustrated in FIG. 3. The input board 160 receives and samples the signals 156, 158, 170, and 216 and provides a value corresponding to the sensed value incident on each signal 156, 158, and 216 to the processor 152. Note that other signals from sensors such as an air pressure sensor can also be sampled and used. The processor 152 may then execute instructions that cause the processor to convert the values corresponding to the sensed values incident on each signal 156, 158, 170, and 216 to values having engineering units appropriate for the mediums sensed, such as position in percent for the throttle position sensor 196, rotations per minute or rpm for the engine rotational speed sensor 200, and degrees for the coolant temperature sensor 210 and the air temperature sensor 168. The processor 152 may then execute instructions that cause the processor to calculate fuel quantities to be provided to the engine as is described herein. The processor 152 may furthermore provide one or more outputs through an output board 164, such as output 166 to, for example, a fuel supplying device such as the fuel injector 206 illustrated or a carburetor based on the results of the engine fuel quantity determination.

Figure 4:
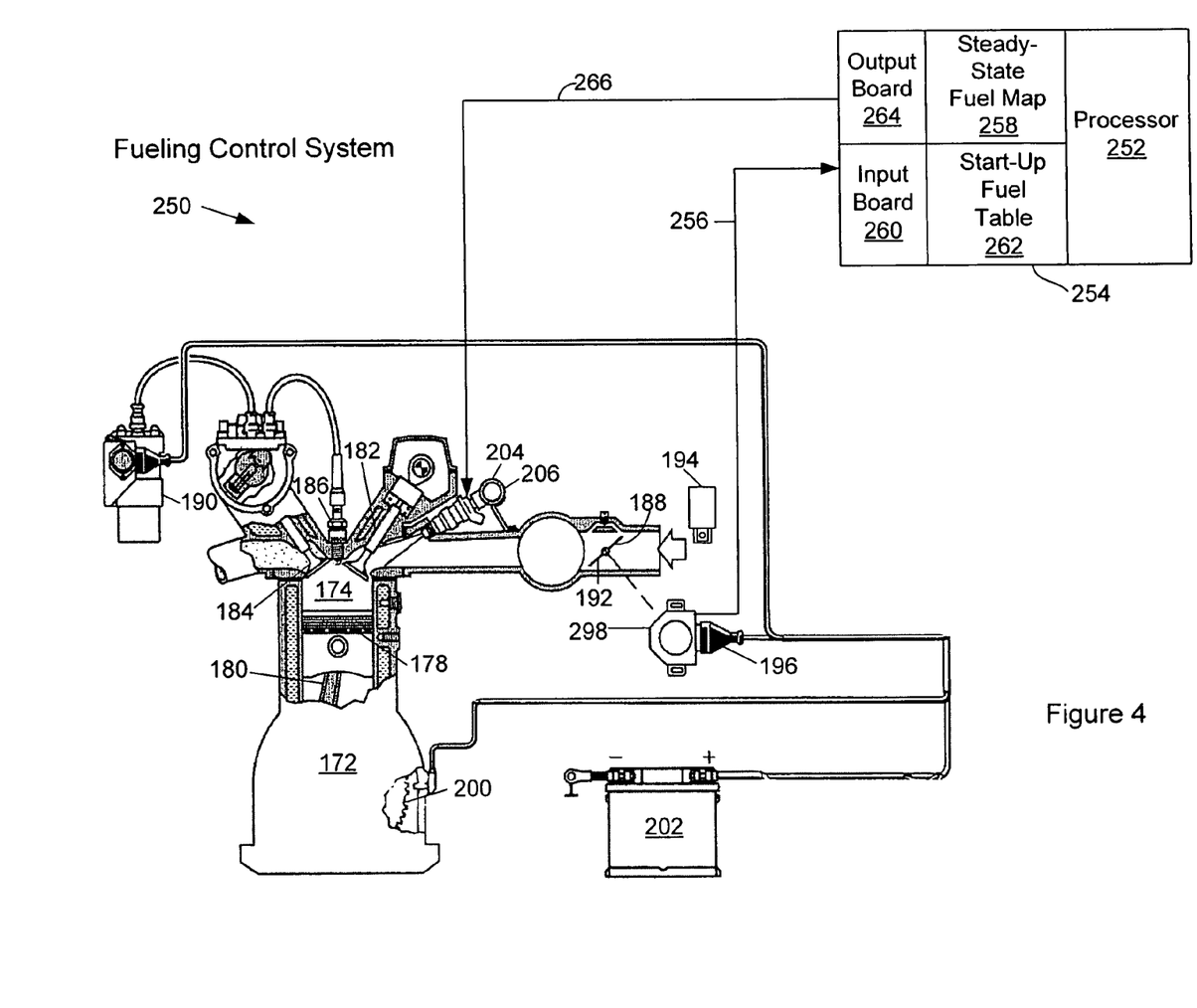
FIG. 4 illustrates an embodiment of an engine fueling device with which fuel, including starting fuel, may be provided to an engine.

In an embodiment of engine starting shown in FIG. 4, an engine fueling device 250 is utilized to start an engine 172. The engine fueling device 250 includes a processor 252 to receive a signal 256 that corresponds to desired engine load and to output a signal 266 that corresponds to a quantity of fuel to be provided to the engine 172. The processor 252 may also receive other signals including a current engine load signal (not shown) and may also output additional signals to provide complete or partial engine control. The processor 252 may determine a quantity of fuel to be provided to start the engine 172, the quantity of fuel corresponding to a value incident on the signal 256 corresponding to desired engine load. The quantity of fuel may be determined by referencing a start-up fuel table 262 at a position that corresponds to the desired engine load as has been described herein. Alternately, the quantity of fuel may be determined by referencing a fueling map such as a steady-state fueling map 258 at a position that corresponds to the desired engine load and applying a function to the quantity of fuel retrieved from that fueling map as described herein to arrive at a quantity of fuel to be provided to start the engine 172.

The desired engine load may be sensed by a throttle position sensor 298, an IACV, or a throttle bypass circuit, for example. The signal 266 that corresponds to a quantity of fuel to be provided to the engine 172 may furthermore be transmitted to a fuel supply control device 204 such as a fuel injector 206. After the engine 172 has started, the fuel supply control device 204 may transition to control based on a fueling map such as a steady-state fueling map 258 that may provide a fueling signal 266 corresponding to fuel quantities to be provided at a sensed current engine speed and desired load.

It should be recognized that the engine configurations illustrated herein and the fuel quantities discussed herein have been used to exemplify and explain issues related to engine starting and it should be recognized that engine starting may be applied to other engines having other configurations and using other fuel quantities.

What is claimed is:

1. An engine starting method, comprising:
   determining a first quantity of fuel based on engine temperature;
   providing the first quantity of fuel to the engine during a first cycle of the engine;
   determining a second quantity of fuel based on engine temperature;
   providing the second quantity of fuel to the engine subsequently; and
   transitioning to an alternative fueling strategy.

2. The engine starting method of claim 1, wherein engine speed is not considered in the determination of the first and second quantities of fuel and engine speed is considered in the alternative fueling strategy.

3. The engine starting method of claim 1, wherein a third quantity of fuel is determined based on engine temperature and provided to the engine prior to transitioning to the alternative fueling strategy.

4. The engine starting method of claim 1, wherein the first and second quantities of fuel are further determined based on the temperature of air entering the engine.

5. The engine starting method of claim 1, wherein the first and second quantities of fuel are further determined based on the barometric pressure of air entering the engine.

6. The engine starting method of claim 1, wherein the first and second quantities of fuel are further determined based on engine load.

7. The engine starting method of claim 1, wherein the first and second quantities of fuel are further determined based on a throttle position.

8. The engine starting method of claim 1, wherein the first and second quantities of fuel are further determined based on an idle air control valve position.

9. The engine starting method of claim 1, wherein the first and second quantities of fuel are further determined based on a throttle bypass circuit.

10. The engine starting method of claim 1, further comprising providing a priming fuel quantity prior to a first cycle of the engine.

11. The engine starting method of claim 10, wherein the priming quantity of fuel is provided when a throttle is actuated past a predetermined point.

12. The engine starting method of claim 1, wherein the engine is started by a manually operated mechanism.

13. The engine starting method of claim 1, wherein the engine is started by a battery powered mechanism.

14. The engine starting method of claim 1, wherein the second quantity of fuel is determined based on the first quantity of fuel.

15. The engine starting method of claim 1, wherein:
the engine is a 4-stroke engine;
the first quantity of fuel is delivered during a first 360 degrees of engine rotation; and
the second quantity of fuel is delivered during a second 360 degrees of engine rotation.

* * * * *